United States Patent [19]

Canup

[11] 4,003,354

[45] Jan. 18, 1977

[54] MEANS AND METHOD FOR CONTROLLING THE OCCURRENCE AND THE DURATION OF TIME INTERVALS DURING WHICH SPARKS ARE PROVIDED IN A MULTICYLINDER INTERNAL COMBUSTION ENGINE

[75] Inventor: Robert E. Canup, Chester, Va.

[73] Assignee: Texaco Inc., New York, N.Y.

[22] Filed: Dec. 19, 1974

[21] Appl. No.: 534,254

[52] U.S. Cl. .................... 123/117 R; 123/148 E
[51] Int. Cl.$^2$ ................................. F02P 5/08
[58] Field of Search .... 123/117 R, 117 A, 146.5 A, 123/148 E

[56] References Cited
UNITED STATES PATENTS

| | | | |
|---|---|---|---|
| 3,738,339 | 6/1973 | Huntzinger et al. | 123/148 E X |
| 3,756,212 | 9/1973 | Schirmer et al. | 123/148 E |
| 3,811,420 | 5/1974 | Vogel | 123/148 E |
| 3,853,103 | 12/1974 | Wahl et al. | 123/146.5 A X |
| 3,874,351 | 4/1975 | Asler et al. | 123/148 E X |

*Primary Examiner*—Charles J. Myhre
*Assistant Examiner*—Tony M. Argenbright
*Attorney, Agent, or Firm*—T. H. Whaley; C. G. Ries; Ronald G. Gillespie

[57] ABSTRACT

A control system controls the occurrence and the duration of time intervals during which sparks may be provided in the cylinders of an internal combustion engine driving a crank shaft as a function of loading parameters on the engine. In an automotive engine control system, parameters such as the vacuum in the carburetor, the throttle setting and the torque of the crank shaft are sensed, and corresponding signals are provided by the sensor. A distributor provides a pulse signal having a repetition rate corresponding to the rotational speed of the crank shaft. A frequency-to-voltage converter converts the pulse signal to an output voltage. The sensed parameter signals and the voltage from the converter are summed. The sum signal is used to control a one-shot multivibrator which is triggered by each pulse in the pulse signal from the distributor. The sum signal controls the width of the pulse from the one-shot multivibrator so as to control the timing of the various sparks in the engine's cylinders. The voltage provided by the frequency-to-voltage converter is applied to another one-shot multivibrator which is triggered by the output from the first one-shot multivibrator to control the width of the pulse provided by the second one-shot, the pulse provided by the second one-shot is applied to the ignition system and controls the duration of the spark time interval being applied to each cylinder, as a function of the rotational speed of the crank shaft.

9 Claims, 1 Drawing Figure

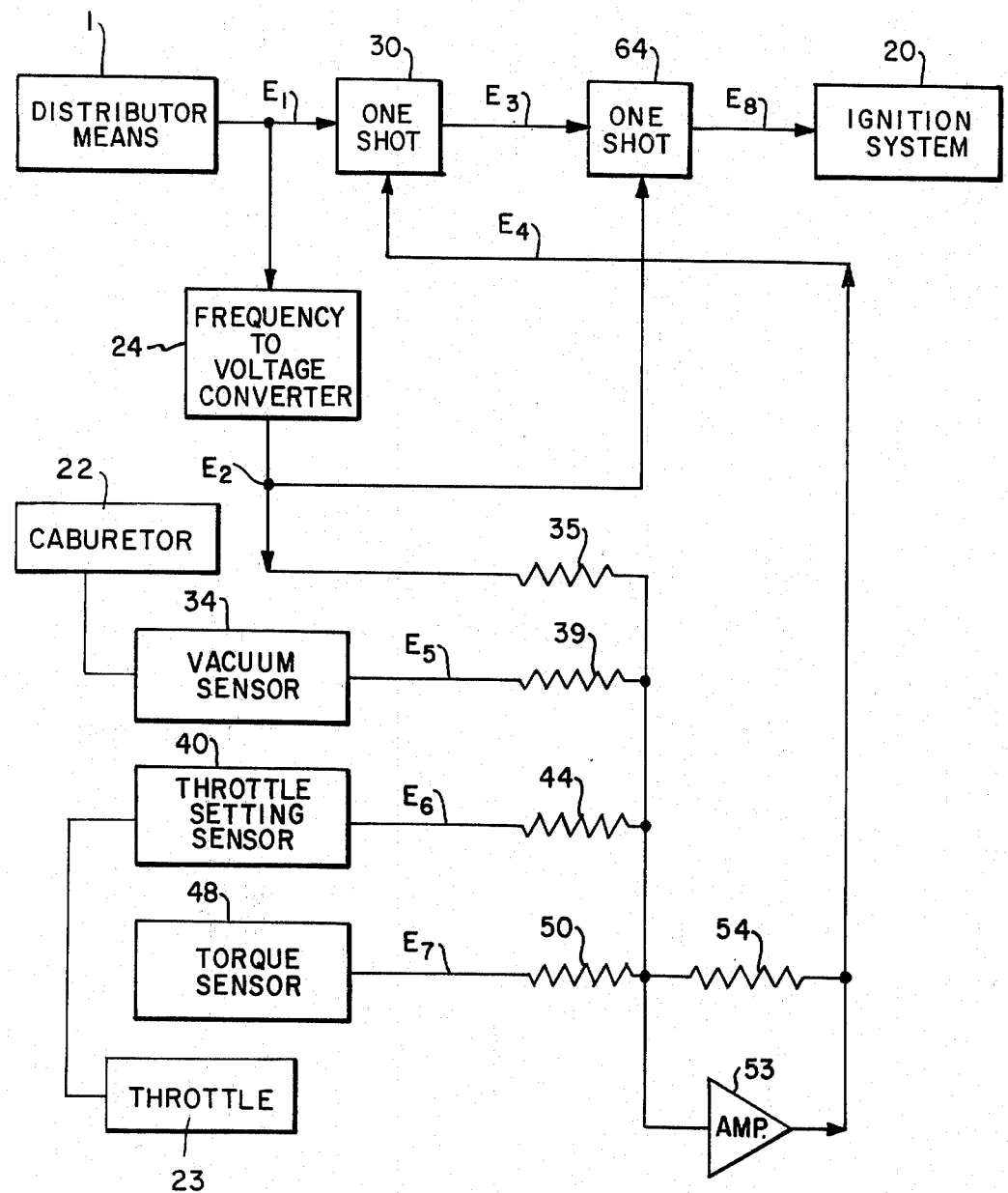

MEANS AND METHOD FOR CONTROLLING THE OCCURRENCE AND THE DURATION OF TIME INTERVALS DURING WHICH SPARKS ARE PROVIDED IN A MULTICYLINDER INTERNAL COMBUSTION ENGINE

BACKGROUND OF THE INVENTION

Field of the Invention

The present invention relates to control systems in general and, more particularly, to a control system for controlling the ocurrence and the duration of sparks being provided to various cylinders in an internal combustion engine.

SUMMARY OF THE INVENTION

A system controls the occurrence and duraction of spark time intervals in a multicylinder internal combustion engine driving a crank shaft. The system includes a distributor providing pulses having a repetition rate corresponding to the rotational speed of the crank shaft driven by the internal combustion engine. A frequency-to-voltage converter converts the pulses provided by the distributor to a voltage whose amplitude corresponds to the repetition rate of the pulses from the distributor. Different operating parameters associated with the internal combustion engine are sensed by the sensors. A control signal network provides a control signal in accordance with the signals from the sensors and the voltage from the converter. A first pulse circuit provides a first pulse signal in accordance with the pulses from the distributor and the control signal. A second pulse network provides a second pulse signal in accordance with the first pulse signal and the voltage from the converter. Apparatus connected to the second pulse network provides sparks during the spark time intervals to the different cylinders in a predetermined manner in accordance with the second pulse signal so as to control the occurrence and the duration of the spark time intervals.

The objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The Figure is a simplified block diagram of a control system, constructed in accordance with the present invention, for controlling the occurrence and the duration of time intervals during which sparks occur in an internal combustion engine.

DESCRIPTION OF THE INVENTION

Referring to the Figure, distributor means 1 provides a pulse signal $E_1$. If, for example, an ignition system 20 provides ignition for an 8-cylinder automotive internal combustion engine (not shown) having a carburetor 22 and a throttle 23, then eight pulses in signal $E_1$ would comprise one cycle. Each cycle of pulse signal $E_1$ corresponds to two full turns of a crank shaft (not shown) being driven by the engine. Distributor means 1 may be of the type described and disclosed in U.S. Pat. No. 3,792,261 (issued Feb. 12, 1974), although it is not restricted thereto. Ignition system 20 may be of the type disclosed and described in U.S. Pat. No. 3,792,695 (issued Feb. 19, 1974), in which the input to ignition system 20 would be applied to transistor 72, and elements 54, 61, 65, 66 and 67 would be omitted. However, ignition system 20 is not restricted to U.S. Pat. No. 3,792,695.

Pulse signal $E_1$ is applied to a conventional type frequency-to-voltage converter 24 which provides a voltage $E_2$ whose amplitude corresponds to the pulse repetition rate of pulse signal $E_1$. Signal $E_1$ is also applied to a one-shot multivibrator 30 which provides a pulse $E_3$ for each pulse in signal $E_1$. The width of each pulse $E_3$ is controlled by a control signal $E_4$. The advancing or retarding of the spark is controlled by controlling the width of pulses $E_3$.

Thus, by way of example, if the maximum spark advance desired is 50° in advance of Top Dead Center (TDC) of the pistons in the cylinders, distributor means 1 provides signal $E_1$ so that each pulse in signal $E_1$ occurs 50° in advance of TDC for a corresponding piston. As hereinafter explained, a spark time interval will be provided after the termination of each pulse $E_4$. Therefore when the pulse width of pulse $E_3$ is reduced, the spark time interval is advanced. When the pulse width of pulse $E_3$ is increased, the spark time interval is retarded. A spark time interval is the time during which ignition system 20 provides sparks to a cylinder of the engine.

Control signal $E_4$ controls the advancement or retardation of the spark time intervals as a function of the load and power requirements of the engine. Voltage $E_2$, which corresponds to the rotational speed of the crank shaft, is applied to a summing resistor 35. A vacuum sensor 4, which may be of a conventional type, connected to carburetor 22 provides a signal $E_5$, corresponding to a vacuum in the carburetor 22, to another summing resistor 39. A throttle-setting sensor 40 connected to throttle 23 provides a signal $E_6$, corresponding to the position of the throttle 23, to a summing resistor 44. A torque sensor 48, which may be a strain gauge connected to the crank shaft, provides a signal $E_7$ to a summing resistor 50, corresponding to the torque of the crank shaft. Summing resistors 35, 39, 44 and 50 have values empirically selected to weight the signals from the various sensors. Summing resistors 35, 39, 44 and 50 are connected to an input of an amplifier 53 and to a feedback resistor 54. Resistor 54 is also connected to an output of amplifier 53. Amplifier 53 provides control signal $E_4$, which corresponds to the weighted sum of signals $E_5$, $E_6$ and $E_7$ and voltage $E_2$ so that the spark time intervals advance or retardation is controlled as a function of the crank shaft rotational speed, the carburetor's 22 vacuum, the throttle 23 setting, and the crank shaft torque.

The trailing edge of each pulse $E_3$ from one-shot 30 triggers another one-shot multivibrator 64 which provides a pulse $E_8$ to ignition system 20. Ignition system 20 provides a spark for the duration of each pulse $E_8$. The pulse width of each pulse $E_8$ is controlled by signal $E_2$ so that when the engine is running fast, the pulse width of pulses $E_8$ is reduced. When the engine is running slow, the pulse width of pulses $E_8$ is increased. Thus, the spark time intervals duration is controlled as a function of the engine's speed.

The apparatus and method of the present invention as heretofore described control the occurrence and the duration of spark time intervals provided to the cylinders of an internal combustion engine. The spark time interval occurrences are controlled as a function of several operating parameters so as to advance it or retard it. The spark time interval durations are also controlled as a function of the engine speed.

What is claimed is:

1. In a multicylinder internal combustion engine having a crankshaft, a system for controlling the occurrence and duration of time intervals during which sparks are provided in said engine, comprising pulse source means for providing pulses having a repetition rate corresponding to the rotational speed of the crank shaft being driven by the internal combustion engine, frequency-to-voltage converter means connected to the pulse source means for providing a voltage whose amplitude corresponds to the repetition rate of the pulses from the pulse source means, a plurality of sensing means for sensing different operating parameters associated with the internal combustion engine, control signal means connected to all the sensing means and to the converter means for providing a control signal in accordance with the signals from the sensing means and the voltage from the converter means, first pulse signal means connected to the distributor means and to the control signal means for providing a first pulse signal in accordance with the pulses from the distributor means and the control signal, the widths of the pulses in the first pulse signal control the times of occurrence of the spark time intervals, second pulse signal means connected to the first pulse signal means and to the converter means for providing a second pulse signal in accordance with the first pulse signal and the widths of the pulses in the second pulse signal control the durations of the spark time intervals, and the voltages from the converter means, and means connected to the second pulse signal means for providing sparks to cylinders in the engine in a predetermined manner in accordance with the second pulse signal.

2. A system as described in claim 1 in which the number of pulses in each cycle of the second pulse signal corresponds to the number of cylinders in the engine, and the spark means provides the sparks to a cylinder during the occurrence of a corresponding pulse in each cycle of the second pulse signal in a manner so that each cylinder is provided sparks at a different time than another cylinder being provided sparks during each cycle of the second pulse signal.

3. A system as described in claim 2 in which the first pulse signal means includes a monostable multivibrator connected to the pulse source means and to the control signal means which is triggered by each pulse from the pulse source means while the width of the pulse corresponds to the amplitude of the control signal, and the second pulse signal means includes a second monostable multivibrator connected to the first monostable multivibrator and to the converter means for providing a pulse upon completion of a pulse from the first monostable multivibrator whose width is controlled by the voltage from the converter means.

4. A system as described in claim 3 in which the internal combustion engine includes a carburetor which controls the fuel mixture provided to the cylinders, and a throttle which controls the quantity of fuel provided to the carburetor; and the sensing means includes a vacuum sensor sensing a vacuum in the carburetor and providing a signal corresponding thereto, a sensor sensing the position of the throttle and providing a signal representative of the sensed throttle position, and a sensor sensing the torque of the crank shaft and providing a corresponding signal.

5. A system as described in claim 4, in which the control signal means includes a plurality of summing resistors, each resistor, except one, having one end connected to a corresponding sensor and the other end connected to the other resistors, and the one resistor has one end connected to the other resistors; and amplifier having an input connected to the common connection of the summing resistors and an output connected to the first monostable multivibrator, and a feedback resistor connecting connecting the input and the output of the amplifier.

6. A method for controlling the occurrence and the duration of time intervals during which sparks are provided in a multicylinder internal combustion engine for driving a crank shaft which comprises the steps of providing speed pulses having a repetition rate corresponding to the rotational speed of the crank shaft driven by the engine, providing a voltage in accordance with the speed pulses whose amplitude corresponds to the repetition rate of the speed pulses, sensing different operating parameters associated with the engine, providing signals corresponding to the sensed operating parameters, providing a control signal in accordance with the sensed parameter signals and the voltage, providing a first pulse signal in accordance with the speed pulses and the control signal so that the widths of the pulses in the first pulse signal control the times of occurrence of the spark time intervals, providing a second pulse signal in accordance with the first pulse signal and the voltage so that the widths of the pulses in the second pulse signal control the durations of the spark time intervals, and providing sparks in the cylinders of the multicylinder engine in accordance with the second pulse signal so as to control the occurrence and the duration of the time intervals during which the sparks are provided to the cylinders.

7. A method as described in claim 6, in which the first pulse signal has pulses spaced in accordance with the repetition rate of the speed pulses and the width of each pulse in the first pulse signal is developed in accordance with the control signal, and the second pulse signal provides a pulse upon termination of each pulse in the first pulse signal, and the width of the pulses in the second pulse signal is controlled by the voltage.

8. A method as described in claim 7, in which the internal combustion engine includes a carburetor controlling the fuel mixture provided to the cylinders, and a throttle controlling the quantity of fuel provided to the carburetor;

the sensing step includes sensing the position of the throttle, sensing a vacuum in the carburetor, and sensing the torque of the crank shaft; and the providing of the sensed parameters signal step includes providing a signal corresponding to the sensed position of the throttle, providing a signal corresponding to the sensed vacuum in the carburetor, and providing a signal corresponding to the sensed torque of the crank shaft.

9. A method as described in claim 8 in which the number of pulses in each cycle of the second pulse signal corresponds to the number of cuylinders in the engine, and the spark providing step includes providing sparks to a cylinder during the occurrence of a corresponding pulse in each cycle of the second pulse signal in a manner so that each cylinder is provided sparks at a different time than that of another cylinder being provided sparks during each cycle of the second pulse signal.

* * * * *